United States Patent
Lee et al.

(10) Patent No.: US 10,739,636 B2
(45) Date of Patent: Aug. 11, 2020

(54) POLARIZING PLATE, AND LIQUID CRYSTAL DISPLAY COMPRISING SAME

(71) Applicant: LG CHEM, LTD., Seoul (KR)

(72) Inventors: Hanna Lee, Daejeon (KR); Hye Min Kim, Daejeon (KR); Hyun Sam Son, Daejeon (KR); Kyungki Hong, Daejeon (KR); Yeongrae Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 26 days.

(21) Appl. No.: 16/082,882

(22) PCT Filed: Apr. 28, 2017

(86) PCT No.: PCT/KR2017/004562
§ 371 (c)(1),
(2) Date: Sep. 6, 2018

(87) PCT Pub. No.: WO2017/191946
PCT Pub. Date: Nov. 9, 2017

(65) Prior Publication Data
US 2019/0094612 A1    Mar. 28, 2019

(30) Foreign Application Priority Data

| May 2, 2016 | (KR) | .................. 10-2016-0054216 |
| May 2, 2016 | (KR) | .................. 10-2016-0054218 |
| Apr. 27, 2017 | (KR) | .................. 10-2017-0054363 |

(51) Int. Cl.
*G02F 1/1335*   (2006.01)
*G02F 1/13357*  (2006.01)
*B32B 27/30*    (2006.01)
*G02B 5/30*     (2006.01)
*G02B 1/14*     (2015.01)
*G02B 1/16*     (2015.01)

(52) U.S. Cl.
CPC ........ *G02F 1/133528* (2013.01); *B32B 27/30* (2013.01); *G02B 1/14* (2015.01); *G02B 1/16* (2015.01); *G02B 5/3033* (2013.01); *G02F 1/133602* (2013.01); *G02F 2202/22* (2013.01); *G02F 2202/28* (2013.01); *Y10T 428/105* (2015.01); *Y10T 428/1077* (2015.01)

(58) Field of Classification Search
CPC .. B32B 27/30; G02B 1/14; G02B 1/16; G02B 5/3033; G02F 1/133528; G02F 1/133602; G02F 2202/22; Y10T 428/105; Y10T 428/1077
See application file for complete search history.

(56) References Cited

U.S. PATENT DOCUMENTS

| 2005/0225857 A1 | 10/2005 | Inagaki |
| 2008/0241524 A1 | 10/2008 | Fukuda et al. |
| 2011/0109849 A1 | 5/2011 | Yoo et al. |

(Continued)

FOREIGN PATENT DOCUMENTS

| JP | 2006126585 A | 5/2006 |
| JP | 2006-178424 A | 7/2006 |
| JP | 2010191090 A  * | 9/2010 |

(Continued)

*Primary Examiner* — Sophie Hon
(74) *Attorney, Agent, or Firm* — Dentons US LLP

(57) ABSTRACT

The present application relates to a polarizing plate and a liquid crystal display device including the same.

18 Claims, 1 Drawing Sheet

(56) References Cited

U.S. PATENT DOCUMENTS

2011/0181813 A1\* 7/2011 Kim .................. G02F 1/133528
349/96
2016/0047948 A1\* 2/2016 Kim ........................ G02B 1/14
428/215

FOREIGN PATENT DOCUMENTS

| JP | 2011-028245 A | 2/2011 |
| JP | 2011-526646 A | 10/2011 |
| JP | 2015-203107 A | 11/2015 |
| JP | 2016-024228 A | 2/2016 |
| KR | 1020050003397 A | 1/2005 |
| KR | 1020080088479 A | 10/2008 |
| KR | 1020100009510 A | 1/2010 |
| KR | 1020130041741 A | 4/2013 |
| KR | 1020140082405 A | 7/2014 |
| KR | 1020140118873 A | 10/2014 |
| KR | 1020140140511 A | 12/2014 |
| KR | 1020150026167 A | 3/2015 |
| WO | WO-2014157964 A1 \* | 10/2014 |

\* cited by examiner

[FIG. 1]
[FIG. 2]

POLARIZING PLATE, AND LIQUID CRYSTAL DISPLAY COMPRISING SAME

TECHNICAL FIELD

This application is a National Stage Application of International Application No. PCT/KR2017/004562, filed Apr. 28, 2017, and claims the benefit of Korean Patent Application No. 10-2016-0054218, filed with the Korean Intellectual Property Office on May 2, 2016, Korean Patent Application No. 10-2016-0054216, filed with the Korean Intellectual Property Office on May 2, 2016, 10-2017-0054363, filed Apr. 27, 2017, contents of which are incorporated herein by reference in their entirety for all purposes as if fully set forth below.

The present application relates to a polarizing plate and a liquid crystal display device including the same.

BACKGROUND ART

A polarizing plate is useful as an optical component forming a liquid crystal display device. As a polarizing plate in the art, those having a constitution of laminating a protective layer including a transparent resin film on one surface or both surfaces of a polarizing film using an aqueous adhesive and the like have been used.

As such a transparent resin film, a triacetyl cellulose film (TAC film) has been much used due to its excellent optical transparency or moisture permeability. The polarizing plate is adhered to liquid crystal cells through other optical functional layers as necessary using a gluing agent, and is inserted to a liquid crystal display device.

As a polarizer used in the polarizing plate, a uniaxially extended PVA-based film dyed with iodine is much used, and since it is thin and has poor strength, a protective film is required. However, a TAC film, a polarizer protective film that has been normally used in the art, does not have favorable moisture-heat resistance, and has weak pencil hardness and scratch resistance properties, and separate hard coating is required.

A TAC or acrylic film of a lower polarizing plate of a display faces a diffuser, a prism film or a DBEF film in a backlight unit. Displays become thinner and larger nowadays, and accordingly, a gap between a lower pol and a BLU decreases and lower polarizing plate sagging occurs causing a branching phenomenon of the protective film (TAC, acrylic film) of the lower polarizing plate, and as a result, luminance non-uniformity occurs declining product qualities.

In addition, a protective film for protecting a base film such as TAC/acryl is required when working a polarizing plate, and static electricity may occur when removing the protective film of the lower polarizer in an assembly stage of a final product, and it may damage circuit components. Accordingly, a protective film having an antistatic function needs to be used in order to provide an electro static discharge (ESD) preventing function, which leads to a problem of a process cost increase.

Accordingly, development of a polarizing plate capable of enhancing product qualities by minimizing static electricity generation while reducing process costs has been urgently required.

PRIOR ART DOCUMENTS

Patent Documents

Korean Patent Application Laid-Open Publication No. 10-2010-003717

DISCLOSURE

Technical Problem

The present application is directed to providing a polarizing plate and a liquid crystal display device including the same.

Technical Solution

One embodiment of the present application provides a polarizing plate including a base film; an adhesive layer provided on one surface of the base film; a photocurable resin layer provided on one surface of the adhesive layer; and a protective film provided on one surface of the photocurable resin layer, wherein the photocurable resin layer includes a curable resin of a multifunctional acrylate-based monomer and an acrylate-based oligomer or an acryl-based elastic polymer having an elongation of 5% to 200%, a photopolymerization initiator and an antistatic agent, and the protective film is provided with an antistatic surface on the other surface opposite to the surface facing the photocurable resin layer.

Another embodiment of the present application provides a liquid crystal display device including a backlight unit; a liquid crystal panel provided on one surface of the backlight unit; and the polarizing plate according to the present application provided between the backlight unit and the liquid crystal panel.

Advantageous Effects

A polarizing plate according to one embodiment of the present application is capable of preventing circuit damages caused by static electricity generated when peeling off a protective film since a photocurable resin layer has low sheet resistance and the protective film has an antistatic function leading to a low peeling static voltage.

In addition, a polarizing plate according to one embodiment of the present application has peel strength effective for interfacial adhesion with a protective film while readily peeling off the protective film, and therefore, excellent processibility can be secured.

Furthermore, a polarizing plate according to one embodiment of the present application exhibits high hardness, scratch resistance and high transparency, and no curls or cracks occur due to excellent processibility, and therefore, the polarizing plate can be useful in various display devices and can be used on a base film such as a TAC film without separate coating resulting in thinner devices. In addition, the polarizing plate has excellent processibility and flexibility leading to an advantage of capable of being used in large area or curved displays as well.

DESCRIPTION OF DRAWINGS

FIG. 1 is a diagram illustrating a polarizing plate according to one embodiment of the present application.

FIG. 2 is a diagram illustrating a liquid crystal display device according to one embodiment of the present application.

- 100: Polarizing Plate
- 110: Base Film
- 120: Adhesive Layer
- 130: Photocurable Resin Layer
- 140: Protective Film
- 200: Backlight Unit
- 300: Liquid Crystal Panel

MODE FOR DISCLOSURE

Hereinafter, the present specification will be described in more detail.

When referring to FIG. 1, one embodiment of the present application provides a polarizing plate including a base film (110); an adhesive layer (120) provided on one surface of the base film; a photocurable resin layer (130) provided on one surface of the adhesive layer; and a protective film (140) provided on one surface of the photocurable resin layer, wherein the photocurable resin layer includes a curable resin of a multifunctional acrylate-based monomer and an acrylate-based oligomer having an elongation of 5% to 200%, a photopolymerization initiator and an antistatic agent. The base film, the adhesive layer, the photocurable resin layer and the protective film may be consecutively provided as in FIG. 1. The base film used in one embodiment of the present application may be formed with a polyvinyl alcohol-based resin, and specifically, may be formed by a dichroic dye being adsorption-oriented to a uniaxially oriented polyvinyl alcohol-based resin film.

The polyvinyl alcohol-based resin forming the base film is obtained by saponifying a polyvinyl acetate-based resin. Examples of the polyvinyl acetate-based resin may include, in addition to polyvinyl acetate that is a homopolymer of vinyl acetate, copolymers of vinyl acetate and other monomers copolymerizable therewith, and the like. Examples of the other monomers copolymerizable with vinyl acetate may include unsaturated carboxylic acids, unsaturated sulfonic acids, olefins, vinyl ethers and the like. The degree of saponification of the polyvinyl alcohol-based resin may be commonly from approximately 85 mol % to 100 mol % and specifically from 98 mol % to 100 mol %. The polyvinyl alcohol-based resin may be additionally modified, and for example, polyvinyl formal or polyvinyl acetal modified with aldehydes, or the like, may also be used. In addition, the degree of polymerization of the polyvinyl alcohol-based resin may be commonly from approximately 1,000 to 10,000 and specifically from 1,500 to 10,000.

A film formed with such a polyvinyl alcohol-based resin is used as an original film of a polarizing film. The method of forming a film with the polyvinyl alcohol-based resin is not particularly limited, and known methods may be used to form the film. The film thickness of the original film including the polyvinyl alcohol-based resin is not particularly limited, but, for example, is approximately from 10 μm to 150 μm.

The base film is commonly prepared through a process of uniaxially orientating an original film formed with such a polyvinyl alcohol-based resin mentioned above, a process of dyeing the polyvinyl alcohol-based resin film with a dichroic dye and adsorbing the dichroic dye, a process of treating the dichroic dye-adsorbed polyvinyl alcohol-based resin film with an aqueous boric acid solution, and a process washing with water after treating with the aqueous boric acid solution.

The uniaxial orientation may be carried out before the dyeing with a dichroic dye, may be carried out at the same time as the dyeing, or may be carried out after the dyeing. When carrying out the uniaxial orientation after the dyeing with a dichroic dye, this uniaxial orientation may be carried out before the boric acid treatment or during the boring acid treatment. In addition, the uniaxial orientation may also be carried out in a plurality of these steps. In the uniaxial orientation, the orientation may be uniaxially carried out between roles having a different feeding rate, or the orientation may be uniaxially carried out using a heat roll. In addition, the orientation may be dry orientation carrying out orientation in the atmosphere or may be wet orientation carrying out orientation while being swollen with a solvent. The orientation magnification is normally 4 times to 8 times.

In order to dye the polyvinyl alcohol-based resin film with a dichroic dye, for example, the polyvinyl alcohol-based resin film may be immersed in an aqueous solution containing a dichroic dye. As the dichroic dye, iodine, dichroic dyestuffs and the like are used. In addition, the polyvinyl alcohol-based resin film is preferably immersed in water before the dyeing treatment.

When using iodine as the dichroic dye, a method of immersing the polyvinyl alcohol-based resin film in an aqueous solution containing iodine and potassium iodide is normally employed as the dyeing method. The iodine content in this aqueous solution is normally approximately from 0.01 parts by weight to 0.5 parts by weight with respect to 100 parts by weight of water, and the potassium iodide content is normally approximately from 0.5 parts by weight to 10 parts by weight with respect to 100 parts by weight of water. The temperature of the aqueous solution used in the dyeing is normally approximately from 20° C. to 40° C., and the time of immersion (time of dyeing) in this aqueous solution is normally for approximately 30 seconds to 300 seconds.

Meanwhile, when using a dichroic dyestuff as the dichroic dye, a method of immersing the polyvinyl alcohol-based resin film in an aqueous dyestuff solution including an aqueous dichroic dyestuff aqueous is normally employed as the dyeing method. The content of the dichroic dyestuff in this aqueous dyestuff solution is normally approximately from $1 \times 10^{-3}$ parts by weight to $1 \times 10^{-2}$ parts by weight with respect to 100 parts by weight of water. The aqueous dyestuff solution may contain an inorganic salt such as sodium sulfate as a dyeing auxiliary. The temperature of the aqueous dyestuff solution is normally approximately from 20° C. to 80° C., and the time of immersion (time of dyeing) in the aqueous dyestuff solution is normally for approximately 30 seconds to 300 seconds.

The boric acid treatment after the dyeing with a dichroic dye is carried out by immersing the dyed polyvinyl alcohol-based resin film into a boric acid-containing aqueous solution. The boric acid content in the boric acid-containing aqueous solution is normally approximately from 2 parts by weight to 15 parts by weight and specifically approximately from 5 parts by weight to 12 parts by weight with respect to 100 parts by weight of water. When using iodine as the dichroic dye, the boric acid-containing aqueous solution preferably contains potassium iodide. The potassium iodide content in the boric acid-containing aqueous solution is normally approximately from parts by weight to 20 parts by weight and preferably approximately from 5 parts by weight to 15 parts by weight with respect to 100 parts by weight of water. The time of immersion in the boric acid-containing aqueous solution is normally approximately for 100 seconds to 1,200 seconds, specifically approximately for 150 seconds to 600 seconds, and more specifically approximately for 200 seconds to 400 seconds. The temperature of the boric acid-containing aqueous solution is normally 50° C. or higher and specifically from 50° C. to 85° C.

The polyvinyl alcohol-based resin film after the boric acid treatment is normally washed with water. Washing with water is carried out by, for example, immersing the boric acid-treated polyvinyl alcohol-based resin film in water. The temperature of the water in the washing with water is normally approximately from 5° C. to 40° C., and the time of immersion is approximately for 2 seconds to 120 seconds. After the washing with water, drying treatment is carried out to obtain a base film. The drying treatment may be carried out using a hot-air drier or a far-infrared heater. The drying temperature is normally approximately from 40° C. to 100° C. The time of the drying treatment is normally approximately for 120 seconds to 600 seconds.

As a result, a polarizing film in which a dichroic dye is adsorption-oriented to a uniaxially oriented polyvinyl alcohol-based resin film may be prepared. The base film may have a thickness of 20 μm to 80 μm and specifically 20 μm to 50 μm.

In addition, the photocurable resin layer according to one embodiment of the present application may impose functional elements including an antistatic function to a polarizing plate while being provided on one surface of an adhesive layer. In order to impose such functional elements, the photocurable resin layer may include a curable resin of a multifunctional acrylate-based monomer and an acrylate-based oligomer having an elongation of 5% to 200%, a photopolymerization initiator and an antistatic agent.

The multifunctional acrylate-based monomer means those including two or more acrylate-based functional groups and having a molecular weight of less than 1,000 g/mol. More specifically, for example, hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tetraacrylate (PETA), dipentaerythritol hexaacrylate (DPHA) or the like may be included, however, the multifunctional acrylate-based monomer of the present application is not limited thereto. The multifunctional acrylate-based monomer may be crosslinked to each other, or crosslinked to the acrylate-based oligomer described below to perform a role of providing certain strength and abrasion resistance to the photocurable resin layer.

The multifunctional acrylate-based monomer may be used either alone, or as a combination of different types.

The acrylate-based oligomer is an acrylate having an elongation of approximately 5% to approximately 200%, approximately 5% to approximately 100%, or approximately 10% to approximately 50% when measured in accordance with the ASTM D638, and particularly, means an oligomer having two or more acrylate functional groups. When the acrylate-based oligomer has an elongation in the above-mentioned range, excellent flexibility and elasticity may be obtained without declining mechanical properties. The acrylate-based oligomer satisfying such an elongation range has excellent flexibility and elasticity and forms a curable resin with the acrylate-based monomer, and may provide sufficient flexibility, curl property and the like to the photocurable resin layer including the same.

According to one embodiment of the present application, the acrylate-based oligomer may have a weight average molecular weight in a range of approximately 1,000 g/mol to approximately 10,000 g/mol, approximately 1,000 g/mol to approximately 5,000 g/mol, or approximately 1,000 g/mol to approximately 3,000 g/mol.

According to one embodiment of the present application, the acrylate-based oligomer may be an acrylate-based oligomer modified with one or more types of urethane, ethylene oxide, propylene oxide and caprolactone. When using the modified acrylate-based oligomer, flexibility is further provided to the acrylate-based oligomer due to the modification, and curl property and flexibility of the photocurable resin layer may increase.

The acrylate-based oligomer may be used either alone or as a combination of different types, for example, as a combination with an acrylate-based elastic polymer.

The acrylate-based elastic polymer is a polymer having excellent flexibility and elasticity, and including two or more acrylate functional groups, and may have a weight average molecular weight in a range of approximately 100,000 g/mol to approximately 800,000 g/mol, approximately 150,000 g/mol to approximately 700,000 g/mol, or approximately 180,000 g/mol to approximately 650,000 g/mol.

A protective film formed by using a coating composition including the acrylate-based elastic polymer may secure high elasticity or flexibility while securing mechanical properties, and may minimize curl or crack occurrences.

According to one embodiment of the present application, the acrylate-based elastic polymer may have an elongation of approximately 5% to approximately 200%, approximately 5% to approximately 100%, or approximately 10% to approximately 50% when measured in accordance with the ASTM D638. When the multifunctional acrylate-based elastic polymer has an elongation in the above-mentioned range, excellent flexibility and elasticity may be obtained without declining mechanical properties.

One example of the multifunctional acrylate-based elastic polymer may include polyrotaxane.

Polyrotaxane generally means a compound in which a dumbbell shaped molecule and a cyclic compound (macrocycle) are structurally fitted. The dumbbell shaped molecule includes a certain linear molecule and a blocking group disposed at both ends of such a linear molecule, and the linear molecule penetrates into the cyclic compound. The cyclic compound may move following the linear molecule, and a breakaway is prevented by the blocking group.

According to one embodiment of the present application, the polyrotaxane may include a rotaxane compound including a cyclic compound to which a lactone-based compound having an acrylate-based compound introduced at the end bonds; a linear molecule penetrating the cyclic compound; and a blocking group disposed at both ends of the linear molecule to prevent a breakaway of the cyclic compound.

The cyclic compound may be used without particular limit as long as it has a size enough to penetrate or surround the linear molecule, and may include a functional group such as a hydroxyl group, an amino group, a carboxyl group, a thiol group or an aldehyde group capable of reacting with other polymers or compounds. Specific examples of such a cyclic compound may include α-cyclodextrin, β-cyclodextrin, γ-cyclodextrin or mixtures thereof.

In addition, as the linear molecule, compounds having a linear form while having a certain molecular weight or higher may be used without particular limit, and polyalkylene-based compounds or polycaprolactone groups may be used. Specifically, polyoxyalkylene-based compounds including an oxyalkylene repeating unit having 1 to 8 carbon atoms or polycaprolactone groups including a lactone-based repeating unit having 3 to 10 carbon atoms may be used.

Such a linear molecule may have a weight average molecular weight of approximately 1,000 g/mol to approximately 50,000 g/mol. When a weight average molecular weight of the linear molecule is too small, mechanical properties or a self-healing ability of a protective film prepared using the same may not be sufficient, and when the weight average molecular weight is too large, compatibility of a prepared protective film may decrease, or appearance properties or material uniformity may greatly decrease.

Meanwhile, the blocking group may be properly controlled depending on the properties of polyrotaxane prepared, and for example, one, two or more types selected from the group consisting of a dinitrophenyl group, a cyclodextrin group, an adamantane group, a trityl group, a fluorescein group and a pyrene group may be used.

Another example of the acrylate-based elastic polymer may include a urethane-based acrylate polymer. The urethane-based acrylate polymer has a form of a urethane-based acrylate oligomer being linked to an acrylic polymer main chain as a side branch.

The photocurable resin layer of the present application includes a curable resin in which the multifunctional acrylate-based monomer and the acrylate-based oligomer having an elongation of 5% to 200% described above are cured by ultraviolet rays. In addition, the photocurable resin layer of the present application does not include a triacetyl cellulose (TAC) component.

Examples of the photopolymerization initiator may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoyl formate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide or the like, but are not limited thereto. In addition, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F and the like may be included as products currently commercially available. These photopolymerization initiators may be used either alone or as a mixture of two or more types different from each other.

In addition, the antistatic agent is dispersed into the photocurable resin layer, and may prevent electrification of the photocurable resin layer. By providing an antistatic ability to the photocurable resin layer, electrification by static electricity may be prevented when, for example, peeling off a peel-off film adhered on the photocurable resin layer surface, or binding a polarizing plate to a liquid crystal cell through a gluing layer installed on the photocurable resin layer and then peeling off the polarizing plate, and as a result, destruction of a liquid crystal driver part of a liquid crystal display device caused by static electricity may be effectively suppressed.

The photocurable resin layer of the present application provides an antistatic ability to the protective layer itself by dispersing the antistatic agent into the photocurable resin layer itself formed with a cured material of a curable composition, and therefore, installing a separate antistatic layer is not required. Accordingly, according to the present application, the polarizing plate becomes even more thinner and lighter. In addition, by employing a cured material of a curable composition including the antistatic agent as the protective layer, the thickness of the protective layer itself decreases, adhesion with the polarizing film is enhanced, hardness of the protective layer is enhanced and contraction control of the polarizing film is enhanced while providing an antistatic ability to the protective layer and obtaining a thinner and lighter polarizing plate accompanying antistatic layer omission.

The antistatic agent is not particularly limited, and examples thereof may include ionic compounds, conductive fine particles, conductive polymers and the like. As the ionic compound, ionic compounds having an organic cation and ionic compounds having an inorganic cation may be included.

The ionic compound having an organic cation is not particularly limited, and 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl)imide, 1-butyl-4-methylpyridinium hexafluorophosphate, 1-hexylpyridinium tetrafluoroborate, 1-hexylpyridinium hexafluorophosphate, 1-octylpyridinium hexafluorophosphate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)imide, 1-butyl-3-methylimidazoliumm ethanesulfonate, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-bis(trifluoromethanesulfonyl)imide, 1-ethyl-3-methylimidazolium hexafluorophosphate, 1-ethyl-3-methylimidazolium-p-toluenesulfonate, 1-methylpyrazolium tetrafluoroborate, 3-methylpyrazolium tetrafluoroborate, 1-butyl-1-methylpyrrolidinium hexafluorophosphate, tributylammonium hexafluorophosphate, tetrabutylammonium-p-toluenesulfonate, tetrahexylammonium bis(trifluoromethanesulfonyl)imide, N,N-diethyl-N-methyl-N-(2-methoxyethyl)ammonium tetrafluoroborate, N,N-diethyl-N-methyl-N-(2-methoxyethyl)ammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, 1-butylpyridinium(trifluoromethanesulfonyl)trifluoroacetamide, 1-butyl-3-methylpyridinium(trifluoromethanesulfonyl)trifluoroacetamide, 1-ethyl-3-methylimidazolium(trifluoromethanesulfonyl)trifluoroacetamide, diallyldimethylammonium(trifluoromethanesulfonyl)trifluoroacetamide, glycidyltrimethylammonium(trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, trioctylmethylammonium hexafluorophosphate, N-methyl-N-ethyl-N-propyl-N-pentylammonium bis(trifluoromethanesulfonyl)imide, (2-hydroxyethyl)trimethylammonium bis(trifluoromethanesulfonyl)imide, (2-hydroxyethyl)trimethylammonium dimethylphosphinate and the like may be included.

The ionic compound having an inorganic cation is not particularly limited, and lithium bromide, lithium iodide, lithium tetrafluoroborate, lithium hexafluorophosphate, lithium thiocyanate, lithium perchlorate, lithium trifluoromethanesulfonate, lithium bis(trifluoromethanesulfonyl)imide, lithium bis(pentafluoroethanesulfonyl)imide, lithium tris(trifluoromethanesulfonyl)methide and the like may be included.

The conductive fine particles are not particularly limited, and examples thereof may include conductive inorganic particles such as antimony-doped tin oxide, phosphorous-doped tin oxide, antimony oxide, zinc antimonate, titanium oxide, zinc oxide or indium tin oxide (ITO).

The conductive polymer may include polyaniline, polypyrrole, polyacetylene, polythiophene and the like.

Among the antistatic agents, using ionic compounds is preferred in terms of excellent compatibility with active energy ray-curable compounds, and using ionic compounds having organic cations is more preferred. Among the ionic compounds having organic cations, using onium-based compounds is even more preferred.

Such an antistatic agent may be used either alone or as a combination of two or more types. In addition, examples of the antistatic agent are not limited to the materials listed above.

According to one embodiment of the present application, the curable resin may be obtained by curing the multifunctional acrylate-based monomer and the acrylate-based oligomer having an elongation of 5% to 200% in a weight ratio of approximately 2:8 to approximately 8:2, approximately 3:7 to approximately 7:3, or approximately 4:6 to approximately 6:4. When the curable resin is cured in the above-mentioned range, the photocurable resin layer of the present application may have sufficient flexibility without declining mechanical properties.

The photocurable resin layer of the present application is capable of having high hardness and being thinner without optical property decline by including a curable resin in which a multifunctional acrylate-based monomer and an acrylate-based oligomer having an elongation of 5% to 200% are cured. In addition, excellent surface hardness and scratch resistance properties are obtained without a separate functional coating layer such as hard coating. Moreover, excellent flexibility and impact resistance may be secured enabling applications in large area or curved displays. In addition, a curable resin layer is included instead of an oriented film, and therefore, a phase difference value is substantially low of closer to 0, and as a result, the photocurable resin layer of the present application may be used not only in a film for protecting a polarizer but also in various display devices requiring a low phase difference value without limit in the applications.

By including a curable resin in which an acrylate-based oligomer is crosslinking-polymerized together with the multifunctional acrylate-based monomer described above, the photocurable resin layer according to the present specification may have flexibility while exhibiting high hardness. Accordingly, the photocurable resin layer according to the present specification may be used as a multifunctional polarizer photocurable resin layer by performing a role of a hard coating layer while having a function of a polarizer protective layer without a separate functional coating layer.

According to one embodiment of the present application, the photocurable resin layer of the present application may further include inorganic fine particles. The inorganic fine particles may be included in a form of being dispersed into the curable resin.

As the inorganic fine particles, inorganic fine particles having nano-scaled particle diameters, for example, nano fine particles having particle diameters of 100 nm or less, 10 nm to 100 nm, or 10 nm to 50 nm may be included. In addition, examples of the inorganic fine particles may include silica fine particles, aluminum oxide particles, titanium oxide particles, zinc oxide particles or the like.

By including the inorganic fine particles, hardness of the photocurable resin layer may be further enhanced.

According to one embodiment of the present application, when the photocurable resin layer further includes the inorganic fine particles, the inorganic fine particles may be included in approximately 1 part by weight to approximately 100 parts by weight, or included in approximately 10 parts by weight to approximately 50 parts by weight when the total weight of the curable resin is employed as 100 parts by weight. By including the inorganic fine particles in the above-mentioned range, a photocurable resin layer having excellent high hardness and flexibility may be provided.

According to one embodiment of the present application, the photocurable resin layer may have a thickness of approximately 1 μm or greater, for example, approximately 1 μm to approximately 50 μm, or approximately 1 μm to approximately 20 μm. According to the present application, the photocurable resin layer may be prepared to be thinner by having such a thickness compared to films including a separate coating layer, and a photocurable resin layer having high hardness may be provided without curl or crack occurrences.

As described above, the polarizing plate photocurable resin layer of the present application may be formed by photocuring a resin composition including the multifunctional acrylate-based monomer, the acrylate-based oligomer having an elongation of 5% to 200%, the photopolymerization initiator, the antistatic agent and, selectively, the inorganic fine particles, and an organic solvent.

As the organic solvent, alcohol-based solvents such as methanol, ethanol, isopropyl alcohol or butanol, alkoxyalcohol-based solvents such as 2-methoxyethanol, 2-ethoxyethanol or 1-methoxy-2-propanol, ketone-based solvents such as acetone, methyl ethyl ketone, methyl isobutyl ketone, methyl propyl ketone or cyclohexanone, ether-based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether or diethylene glycol-2-ethylhexyl ether, aromatic solvents such as benzene, toluene or xylene, and the like may be used either alone or as a mixture.

In addition, the photocurable resin layer may include the photopolymerization initiator in 0.1 parts by weight to 2 parts by weight and the antistatic agent in 1 part by weight to 10 parts by weight when employing the total weight of the curable resin as 100 parts by weight. In the above-mentioned numerical range, the photocurable resin layer may have a target sheet resistance, peeling static voltage and peel strength.

Meanwhile, the resin composition may further include, in addition to the multifunctional acrylate-based monomer, the acrylate-based oligomer having an elongation of 5% to 200%, the inorganic fine particles, the photopolymerization initiator and the organic solvent described above, additives commonly used in the art such as a UV absorber, a surfactant, an anti-yellowing agent, a leveling agent or an antifouling agent. In addition, the content is not particularly limited since the content may be controlled diversely within a range that does not decline properties of the photocurable resin layer of the present application.

According to one embodiment of the present application, the resin composition may include, for example, a surfactant as the additive, and the surfactant may be monofunctional to difunctional fluorine-based acrylate, a fluorine-based surfactant or a silicone-based surfactant. Herein, the surfactant may be included in the form of being dispersed or crosslinked in the curable resin.

In addition, the resin composition may include an anti-yellowing agent as the additive, and as the anti-yellowing agent, benzophenone-based compounds, benzotriazole-based compounds or the like may be included.

In addition, the release surface may include any one selected from the group consisting of silicone-based and melamine-based. Types of the silicon-based may include a silicone resin commonly used for release treatment, and although not particularly limited thereto, types of the melamine-based may be any one selected from among a benzoguanamine-melamine-formaldehyde resin and a melamine-formaldehyde resin.

The release surface is prepared on a surface of the protective film facing the photocurable resin layer, and may additionally lower a peeling static voltage by preventing adhesion between the protective film and the photocurable resin layer and thereby reducing friction caused by the adhesion during peel off.

In addition, according to one embodiment of the present specification, the antistatic surface may include an antistatic agent. Descriptions on the antistatic agent are the same as above, and are not repeated.

According to one embodiment of the present application, the photocurable resin layer may have sheet resistance of $10^8$ to $10^{12}$ or less.

According to one embodiment of the present application, the photocurable resin layer may have a peeling static voltage of 0.1 kV to 2 kV or less, and specifically 0.1 kV to 1 kV or less.

According to one embodiment of the present application, peel strength between the photocurable resin layer and the protective film may be from 5 g/2.5 cm to 30 g/2.5 cm, and specifically from 10 g/2.5 cm to 20 g/2.5 cm.

The photocurable resin layer of the present application preferably has a thickness of 3 μm to 50 μm. When the thickness is less than 3 μm, sheet resistance increases and it is difficult to suppress static electricity generation when peeling off the protective film. When the thickness is greater than 50 μm, mechanical properties such as crack resistance may become weak.

In addition, according to one embodiment of the present application, a maintenance layer including a thermoplastic resin may be further included between the photocurable resin layer and the adhesive layer. The maintenance layer may be provided in order to provide additional functionality to the polarizing plate.

Accordingly, the maintenance layer may further include a photocurable resin including a photocurable functional group. Heat resistance, moisture-heat resistance, water resistance, thermal shock properties and the like may be enhanced due to the photocurable resin including a photocurable functional group.

According to one embodiment of the present application, the maintenance layer may have a thickness of 1 μm to 50 μm, and specifically 1 μm to 20 μm.

In addition, the protective film is provided on one surface of the photocurable resin layer, and protective films commonly used in the art may be used.

The protective film is peeled off during a process of assembling the polarizing plate of the present application, and by the antistatic function of the photocurable resin layer, the protective film may be readily peeled off as static electricity generation is prevented while being peeled off from the photocurable resin layer. In addition, the protective film may have peel strength sufficient to perform a role as a protective film when adhered.

When referring to FIG. 2, one embodiment of the present application provides a liquid crystal display device including a backlight unit (200); a liquid crystal panel (300) provided on one surface of the backlight unit; and the polarizing plate (100) according to the present application provided between the backlight unit and the liquid crystal panel.

In the present specification, the term 'upper surface' means a surface disposed so as to face a viewer when a polarizing plate is installed in a device such as a liquid crystal display. The term 'upper' means a direction facing a viewer when a polarizing plate is installed in a device. On the other hand, the term 'lower surface' or 'lower' means a surface or a direction disposed so as to face an opposite side of a viewer when a polarizing plate is installed in a device.

Layers provided on an upper part or a lower part of the polarizing plate (100) are not limited to FIG. 2, and are in accordance with general liquid crystal display device structures. For example, a lower glass substrate, a thin film transistor, a liquid crystal layer, a color filter, an upper glass substrate, an upper polarizing plate and the like may be provided. Accordingly, structures in which some of the layers illustrated in FIG. 2 are modified or excluded as necessary, or other layers, substrates, films, sheets and the like are added may all be included.

For example, the polarizing plate according to one embodiment of the present application may also be used in an upper polarizing plate, an outermost part of a display, rather than a part adjoining the backlight unit.

Hereinafter, workings and effects of the present specification will be described in more detail with reference to specific examples of the present specification. However, such examples are for illustrative purposes only, and the scope of a right of the present disclosure is not defined thereby.

Example 1

A coating solution was prepared by mixing 50 g of trimethylolpropane triacrylate (TMPTA), 20 g of DPCA120 (Nippon Kayaku, caprolactone-modified hexafunctional acrylate), 30 g of 9-ethylene glycol diacrylate (9-EGDA), 5 g of an ionic compound FC4400 (3M), 1 g of a photopolymerization initiator (product name Darocur TPO) and 100 g of ethanol, and, in order to provide an antistatic function, the coating solution was bar coated on a PET film, a protective film provided with an antistatic surface. This was dried for 2 minutes at 60° C., and then irradiated with D-bulb UV (200 mJ/cm$^2$) under nitrogen atmosphere to obtain a photocurable resin layer having a thickness of 10 μm.

Example 2

A coating solution was prepared by mixing 50 g of pentaerythritol tri(tetra)acrylate, 50 g of 9-ethylene glycol diacrylate (9-EGDA), 5 g of an ionic compound FC4400 (3M) and 1 g of a photopolymerization initiator (product name Darocur TPO), and, in order to provide an antistatic function, the coating solution was bar coated on a 38 μm PET film, a protective film provided with an antistatic surface. This was irradiated with D-bulb UV (200 mJ/cm$^2$) under nitrogen atmosphere to obtain a photocurable resin layer having a thickness of 10 μm.

Example 3

A coating solution was prepared by mixing 50 g of trimethylolpropane triacrylate (TMPTA), 50 g of TA604AU (NOF Corporation, ethylene oxide-modified trifunctional acrylate), 5 g of an ionic compound FC4400 (3M), 1 g of a photopolymerization initiator (product name Darocur TPO) and 100 g of ethanol, and, in order to provide an antistatic function, the coating solution was bar coated on a 38 μm PET film, a protective film provided with an antistatic surface. This was dried for 2 minutes at 60° C., and then irradiated with D-bulb UV (200 mJ/cm$^2$) under nitrogen atmosphere to obtain a photocurable resin layer having a thickness of 10 μm.

Example 4

In order to provide an antistatic function to the composition of Example 1, the coating solution was bar coated on a 38 μm PET film, a protective film provided with an antistatic surface. This was dried for 2 minutes at 60° C., and then irradiated with D-bulb UV (200 mJ/cm$^2$) under nitrogen atmosphere to be prepared to have a thickness of 5 μm. A composition of 20 g of PMMA (weight average molecular weight 150,000) and 80 g of MEK was bar coated thereon, and the result was dried for 2 minutes at 100° C. to obtain a photocurable resin layer having a thickness of 10 μm and a total thickness of 15 μm. After that, a polarizing plate was prepared together with a protective film provided with an antistatic surface on the real surface.

Example 5

A coating solution was prepared by mixing 100 g of C150 (product 50% dispersing 20 nm SiO2 into TMPTA of nano resin), 5 g of an ionic compound FC4400 (3M), 1 g of a photoinitiator (product name Darocur TPO) and 100 g of ethanol, and the coating solution was bar coated on a PET film, a protective film provided with an antistatic surface/ silicone release surface. This was dried for 2 minutes at 60° C., and then irradiated with D-bulb UV (200 mJ/cm$^2$) under nitrogen atmosphere to obtain a protective film having a thickness of 10 μm.

Example 6

A coating solution was prepared by mixing 50 g of C150 (product 50% dispersing 20 nm SiO2 into TMPTA of nano resin), 50 g of EB9626 (SK ENTIS, epoxy acrylate), 5 g of an ionic compound FC4400 (3M), 1 g of a photoinitiator (product name Darocur TPO) and 100 g of ethanol, and the coating solution was bar coated on a PET film, a protective film provided with an antistatic surface/silicone release surface. This was dried for 2 minutes at 60° C., and then irradiated with D-bulb UV (200 mJ/cm$^2$) under nitrogen atmosphere to obtain a protective film having a thickness of 10 μm.

Example 7

A coating solution was prepared by mixing 50 g of trimethylolpropane triacrylate, 50 g of 9-ethylene glycol diacrylate, 5 g of an ionic compound FC4400 (3M), 1 g of a photoinitiator (product name Darocur TPO) and 100 g of ethanol, and the coating solution was bar coated on a PET film, a protective film provided with an antistatic surface/ melamine release surface. This was dried for 2 minutes at 60° C., and then irradiated with D-bulb UV (200 mJ/cm$^2$) under nitrogen atmosphere to obtain a protective film having a thickness of 10 μm.

Example 8

The coating solution of Example 1 was bar coated on a PET film, a protective film provided with an antistatic surface/silicone release surface, and this was dried for 2 minutes at 60° C., and then irradiated with D-bulb UV (200 mJ/cm²) under nitrogen atmosphere to be prepared to have a thickness of 5 μm. A composition of 20 g of PMMA (weight average molecular weight 150,000) and 80 g of MEK was bar coated thereon, and the result was dried for 2 minutes at 100° C. to obtain a protective layer having a thickness of 10 μm and a total thickness of 15 μm.

Example 9

A coating solution was prepared by mixing 50 g of trimethylolpropane triacrylate (TMPTA), 20 g of DPCA120 (Nippon Kayaku, caprolactone-modified hexafunctional acrylate), 30 g of 9-ethylene glycol diacrylate (9-EGDA), 5 g of an ionic compound FC4400 (3M), 1 g of a photopolymerization initiator (product name Darocur TPO) and 100 g of ethanol, and, in order to provide an antistatic function, the coating solution was bar coated on a PET film, a protective film provided with an antistatic surface/silicone release surface. This was dried for 2 minutes at 60° C., and then irradiated with D-bulb UV (200 mJ/cm²) under nitrogen atmosphere to obtain a protective film having a thickness of 5 μm.

Example 10

A coating solution was prepared by mixing 50 g of trimethylolpropane triacrylate (TMPTA), 20 g of DPCA120 (Nippon Kayaku, caprolactone-modified hexafunctional acrylate), 30 g of 9-ethylene glycol diacrylate (9-EGDA), 5 g of an ionic compound FC4400 (3M), 1 g of a photopolymerization initiator (product name Darocur TPO) and 100 g of ethanol, and, in order to provide an antistatic function, the coating solution was bar coated on a PET film, a protective film provided with an antistatic surface/silicone release surface. This was dried for 2 minutes at 60° C., and then irradiated with D-bulb UV (200 mJ/cm²) under nitrogen atmosphere to obtain a protective film having a thickness of 3 μm.

Comparative Example 1

A resin composition was prepared by mixing 50 g of pentaerythritol tri(tetra)acrylate, 50 g of 9-ethylene glycol diacrylate (9-EGDA), 1 g of a photopolymerization initiator (TPO) and 100 parts by weight of ethanol, and, in order to provide an antistatic function, the coating solution was bar coated on a 38 μm PET film, a protective film provided with an antistatic surface. This was dried for 2 minutes at 60° C., and then irradiated with D-bulb UV (200 mJ/cm²) under nitrogen atmosphere to obtain a photocurable resin layer having a thickness of 10 μm.

Comparative Example 2

A resin composition was prepared by mixing 50 g of pentaerythritol tri(tetra)acrylate, 50 g of 9-ethylene glycol diacrylate (9-EGDA), 5 g of an ionic liquid FC4400 (3M), 1 g of a photopolymerization initiator (TPO) and 100 parts by weight of ethanol, and the resin composition was bar coated on a 38 μm PET film, a protective film without an antistatic surface. This was dried for 2 minutes at 60° C., and then irradiated with D-bulb UV (200 mJ/cm²) under nitrogen atmosphere to obtain a photocurable resin layer having a thickness of 10 μm.

Comparative Example 3

A resin composition was prepared by mixing 50 g of pentaerythritol tri(tetra)acrylate, 50 g of 9-ethylene glycol diacrylate (9-EGDA), 1 g of a photopolymerization initiator (TPO) and 100 parts by weight of ethanol, and the resin composition was bar coated on a 38 μm PET film, a protective film without an antistatic surface. This was dried for 2 minutes at 60° C., and then irradiated with D-bulb UV (200 mJ/cm²) under nitrogen atmosphere to obtain a photocurable resin layer having a thickness of 10 μm.

Comparative Example 4

A coating solution was prepared by mixing 100 g of pentaerythritol tri(tetra)acrylate, 5 g of an ionic liquid FC4400 (3M), 1 g of a photopolymerization initiator (product name Darocur TPO) and 100 g of ethanol, and the coating solution was bar coated on a 38 μm PET film, a protective film provided with an antistatic surface. This was dried for 2 minutes at 60° C., and then irradiated with D-bulb UV (200 mJ/cm²) under nitrogen atmosphere to obtain a photocurable resin layer having a thickness of 10 μm.

Comparative Example 5

A resin composition was prepared by mixing 50 g of C150 (product 50% dispersing 20 nm SiO2 into TMPTA of nano resin), 50 g of EB9626 (SK ENTIS, epoxy acrylate), 1 g of a photoinitiator (TPO) and 100 parts by weight of ethanol, and the resin composition was bar coated on a PET film, a protective film provided with a silicone release surface without an antistatic function. This was dried for 2 minutes at 60° C., and then irradiated with D-bulb UV (200 mJ/cm²) under nitrogen atmosphere to obtain a protective film having a thickness of 10 μm.

Comparative Example 6

A coating solution was prepared by mixing 50 g of C150 (product 50% dispersing 20 nm SiO2 into TMPTA of nano resin), 50 g of EB9626 (SK ENTIS, epoxy acrylate), 5 g of an ionic compound FC4400 (3M), 1 g of a photoinitiator (product name Darocur TPO) and 100 g of ethanol, and the coating solution was bar coated on a PET film, a protective film provided with a silicone release surface without an antistatic function. This was dried for 2 minutes at 60° C., and then irradiated with D-bulb UV (200 mJ/cm²) under nitrogen atmosphere to obtain a protective film having a thickness of 10 μm.

Comparative Example 7

A coating solution was prepared by mixing 50 g of C150 (product 50% dispersing 20 nm SiO2 into TMPTA of nano resin), g of EB9626 (SK ENTIS, epoxy acrylate), 1 g of a photoinitiator (product name Darocur TPO) and 100 g of ethanol, and the coating solution was bar coated on a PET film, a protective film provided with an antistatic surface/silicone release surface. This was dried for 2 minutes at 60° C., and then irradiated with D-bulb UV under nitrogen atmosphere to obtain a protective film having a thickness of 10 μm.

Comparative Example 8

A coating solution was prepared by mixing 100 g of C150 (product 50% dispersing 20 nm SiO2 into TMPTA of nano resin), 5 g of an ionic compound FC4400 (3M), 1 g of a photoinitiator (product name Darocur TPO) and 100 g of ethanol, and the coating solution was bar coated on a PET film provided with an antistatic surface and without a release surface. This was dried for 2 minutes at 60° C., and then irradiated with D-bulb UV under nitrogen atmosphere to obtain a protective film having a thickness of 10 μm.

Comparative Example 9

A coating solution was prepared by mixing 50 g of trimethylolpropane triacrylate (TMPTA), 20 g of DPCA120 (Nippon Kayaku, caprolactone-modified hexafunctional acrylate), 30 g of 9-ethylene glycol diacrylate (9-EGDA), 5 g of an ionic compound FC4400 (3M), 1 g of a photopolymerization initiator (product name Darocur TPO) and 100 g of ethanol, and, in order to provide an antistatic function, the coating solution was bar coated on a PET film, a protective film provided with an antistatic surface/silicone release surface. This was dried for 2 minutes at 60° C., and then irradiated with D-bulb UV (200 mJ/cm$^2$) under nitrogen atmosphere to obtain a protective film having a thickness of 1 μm.

Comparative Example 10

A coating solution was prepared by mixing 50 g of trimethylolpropane triacrylate (TMPTA), 20 g of DPCA120 (Nippon Kayaku, caprolactone-modified hexafunctional acrylate), 30 g of 9-ethylene glycol diacrylate (9-EGDA), 5 g of an ionic compound FC4400 (3M), 1 g of a photopolymerization initiator (product name Darocur TPO) and 100 g of ethanol, and, in order to provide an antistatic function, the coating solution was bar coated on a PET film, a protective film provided with an antistatic surface/silicone release surface. This was dried for 2 minutes at 60° C., and then irradiated with D-bulb UV (200 mJ/cm$^2$) under nitrogen atmosphere to obtain a protective film having a thickness of 70 μm.

Preparation of Polarizing Plate

Example 11

The photocurable resin layer prepared in Example 1 was adhered to a 25 μm PVA film through lamination using an acryl-based adhesive so that a thickness of the adhesive layer became approximately 1 μm, and the PET film was peeled off.

On the other surface of the PVA, an acrylic film having a thickness of 40 μm was adhered in the same manner to prepare a polarizing plate.

Example 12

A polarizing plate was prepared in the same manner as in Example 11 except that the acryl-based adhesive was used to the photocurable resin layer prepared in Example 2.

Example 13

A polarizing plate was prepared in the same manner as in Example 11 except that the acryl-based adhesive was used to the photocurable resin layer prepared in Example 3.

Example 14

A polarizing plate was prepared in the same manner as in Example 11 except that the acryl-based adhesive was used to the photocurable resin layer prepared in Example 4.

Example 15

A polarizing plate was prepared in the same manner as in Example 11 except that the acryl-based adhesive was used to the photocurable resin layer prepared in Example 5.

Example 16

A polarizing plate was prepared in the same manner as in Example 11 except that the acryl-based adhesive was used to the photocurable resin layer prepared in Example 6.

Example 17

A polarizing plate was prepared in the same manner as in Example 11 except that the acryl-based adhesive was used to the photocurable resin layer prepared in Example 7.

Example 18

A polarizing plate was prepared in the same manner as in Example 11 except that the acryl-based adhesive was used to the photocurable resin layer prepared in Example 8.

Example 19

A polarizing plate was prepared in the same manner as in Example 11 except that the acryl-based adhesive was used to the photocurable resin layer prepared in Example 9.

Example 20

A polarizing plate was prepared in the same manner as in Example 11 except that the acryl-based adhesive was used to the photocurable resin layer prepared in Example 10.

Comparative Example 11

The photocurable resin layer prepared in Comparative Example 1 was adhered to a PVA film through lamination using an acryl-based adhesive so that a thickness of the adhesive layer became approximately 1 μm, and the PET film was peeled off. On the other surface of the PVA, an acrylic film having a thickness of 40 μm was adhered in the same manner to prepare a polarizing plate.

Comparative Example 12

A polarizing plate was prepared in the same manner as in Comparative Example 11 except that the acryl-based adhesive was used to the photocurable resin layer prepared in Comparative Example 2.

Comparative Example 13

A polarizing plate was prepared in the same manner as in Comparative Example 11 except that the acryl-based adhesive was used to the photocurable resin layer prepared in Comparative Example 3.

Comparative Example 14

A polarizing plate was prepared in the same manner as in Comparative Example 11 except that the acryl-based adhesive was used to the photocurable resin layer prepared in Comparative Example 4.

Comparative Example 15

A polarizing plate was prepared in the same manner as in Comparative Example 11 except that the acryl-based adhesive was used to the photocurable resin layer prepared in Comparative Example 5.

Comparative Example 16

A polarizing plate was prepared in the same manner as in Comparative Example 11 except that the acryl-based adhesive was used to the photocurable resin layer prepared in Comparative Example 6.

Comparative Example 17

A polarizing plate was prepared in the same manner as in Comparative Example 11 except that the acryl-based adhesive was used to the photocurable resin layer prepared in Comparative Example 7.

Comparative Example 18

A polarizing plate was prepared in the same manner as in Comparative Example 11 except that the acryl-based adhesive was used to the photocurable resin layer prepared in Comparative Example 8.

Comparative Example 19

A polarizing plate was prepared in the same manner as in Comparative Example 11 except that the acryl-based adhesive was used to the photocurable resin layer prepared in Comparative Example 9.

Comparative Example 20

A polarizing plate was prepared in the same manner as in Comparative Example 11 except that the acryl-based adhesive was used to the photocurable resin layer prepared in Comparative Example 10.

Measurement Method
1) Thickness
The thickness was measured using a digital micrometer.

2) Pencil Hardness

Using a pencil hardness measuring device, hardness without scratches after going back and forth 5 times under a 500 g load was identified for the polarizing plate surface in accordance with the measurement standard JIS K5400.

3) Scratch Resistance After applying a certain load to Steel wool #0000 and rubbing 10 times by going back and forth, a load not causing scratches was identified.

4) Sheet Resistance

Sheet resistance was measured under a 100 V pressurization condition using a surface high resistance meter (Mitsubishi Chemical, Hiresta IP, MCP-HT260).

5) Peeling Static Voltage

The sample was prepared at a temperature of 23° C. and relative humidity of 50% (sample shape: rectangle, sample size: aspect ratio (width:length)=3:4, diagonal length=15 inches).

A constant voltage generated while peeling the film from each of the samples at a rate of 30 m/minute was measured at a 3 cm height from the sample surface using a constant voltage measuring device (STATIRON-M2).

6) Peel Strength

For the polarizing plates prepared in the examples, peel strength between the polarizer and the photocurable resin layer was measured under a condition of a peeling rate of 0.3 m/minute and a peeling angle of 90° using a physical property measuring device (Texture analyzer, Stable Micro Systems, England) under a room temperature condition.

7) High Rate Peel Property

When removing the base (protective) film at a rate of 30 m/minute and an angle of 180°, it was marked as favorable when cleanly peeled off, and NG when torn off or the photocurable resin layer was transferred to the protective film.

8) Crack Resistance

When winding with the photocurable resin layer outward on a rod having a diameter of 10 mm, it was marked as favorable when cracks did not occur, and NG when cracks occurred.

Cases provided with only the antistatic surface are shown in the following Table 1, and cases provided also with the release surface are shown in the following Table 2.

TABLE 1

|  | Example 11 | Example 12 | Example 13 | Example 14 | Comparative Example 11 | Comparative Example 12 | Comparative Example 13 | Comparative Example 14 |
|---|---|---|---|---|---|---|---|---|
| Polarizing Plate Thickness (after Removing Base Film) | 76 μm | 77 μm | 76 μm | 81 μm | 76 μm | 76 μm | 76 μm | 76 μm |
| Pencil Hardness | 2H | H | H | H | H | H | H | 3H |
| Scratch Resistance | 500 g | 300 g | 200 g | 300 g | 300 g | 300 g | 300 g | 700 g |
| Polarizing Plate Sheet Resistance | $10^{11}$ | $10^{10}$ | $10^{10}$ | $10^{10}$ | over | $10^{10}$ | over | $10^{12}$ |
| Protective Film Rear Surface Sheet Resistance | $10^9$ | $10^9$ | $10^9$ | $10^9$ | $10^9$ | over | Over | $10^9$ |
| Peeling Static Voltage (kV) | 0.97 | 0.83 | 0.80 | 1.13 | 2.65 | 2.32 | 3.17 | NG |
| Peel Strength (g/2.5 cm) | 15.3 | 12.5 | 11.7 | 13.1 | 14.3 | 12.8 | 13.7 | 32.2 |
| High Rate Peel Property | Favorable | Favorable | Favorable | Favorable | Favorable | Favorable | Favorable | NG |

As shown in Table 1, the polarizing plate including the photocurable resin layer and the protective film provided with an antistatic surface according to one embodiment of the present application exhibited target performance in terms of pencil hardness and scratch resistance while maintaining the same degree of thickness, and had relatively low peeling static voltage and peel strength while having proper polarizing plate sheet resistance and protective film rear surface sheet resistance values, and therefore, may reduce damages that may occur when removing the protective film due to static electricity.

TABLE 2

|  | Example 15 | Example 16 | Example 17 | Example 18 | Comparative Example 15 | Comparative Example 16 | Comparative Example 17 | Comparative Example 18 |
|---|---|---|---|---|---|---|---|---|
| Polarizing Plate Thickness (after Removing Base Film) | 76 μm | 77 μm | 76 μm | 81 μm | 76 μm | 76 μm | 76 μm | 76 μm |
| Pencil Hardness | 3H | 2H | H | 3H | 2H | 2H | 2H | 3H |
| Scratch Resistance | 500 g | 400 g | 300 g | 500 g | 300 g | 300 g | 300 g | 700 g |
| Polarizing Plate Sheet Resistance | $10^{12}$ | $10^{11}$ | $10^{10}$ | $10^{12}$ | over | $10^{11}$ | over | $10^{12}$ |
| Protective Film Rear Surface Sheet Resistance | $10^9$ | $10^9$ | $10^9$ | $10^9$ | Over | over | $10^9$ | $10^9$ |
| Peeling Static Voltage (kV) | 0.75 | 0.45 | 0.36 | 0.92 | 2.80 | 1.83 | 2.26 | NG |
| Peel Strength (g/2.5 cm) | 12.9 | 13.5 | 31 | 36.4 | 14.2 | 13.3 | 13.7 | 32.2 |
| High Rate Peel Property | Favorable | Favorable | Favorable | Favorable | Favorable | Favorable | Favorable | NG |

As shown in Table 2, the polarizing plate including the photocurable resin layer and the protective film provided with an antistatic surface/release surface according to one embodiment of the present application exhibited target performance in terms of pencil hardness and scratch resistance while maintaining the same degree of thickness, and had relatively low peeling static voltage and peel strength while having proper polarizing plate sheet resistance and protective film rear surface sheet resistance values, and therefore, may reduce damages that may occur when removing the protective film due to static electricity.

TABLE 3

|  | Example 19 | Example 20 | Comparative Example 19 | Comparative Example 20 |
|---|---|---|---|---|
| Polarizing Plate Thickness (after Removing Base Film) | 71 μm | 69 μm | 67 μm | 136 μm |
| Pencil Hardness | H | H | F | 3H |
| Scratch Resistance | 300 g | 200 g | 50 g | 500 g |
| Polarizing Plate Sheet Resistance | $10^{11}$ | $10^{12}$ | over | $10^{10}$ |
| Protective Film Rear Surface Sheet Resistance | $10^9$ | $10^9$ | $10^9$ | $10^9$ |
| Peeling Static Voltage (kV) | 0.47 | 0.67 | 2.12 | 0.37 |
| Peel Strength (g/2.5 cm) | 15.3 | 12.5 | 11.7 | 13.1 |
| High Rate Peel Property | Favorable | Favorable | Favorable | Favorable |
| Crack Resistance | Favorable | Favorable | Favorable | NG |

As shown in Table 3, it was seen that, when the thickness of the photocurable resin layer according to one embodiment of the present specification was 3 μm or less, effects decreased in terms of polarizing plate sheet resistance, and when the thickness of the photocurable resin layer was 50 μm or greater, target effects were not obtained in crack resistance.

The invention claimed is:
1. A polarizing plate comprising:
a base film;
an adhesive layer provided on one surface of the base film;
a photocurable resin layer provided on one surface of the adhesive layer;
a maintenance layer between the photocurable resin layer and the adhesive layer, the maintenance layer includes a thermoplastic resin and a photocurable resin including a photocurable functional group between; and
a protective film provided on one surface of the photocurable resin layer;
wherein the photocurable resin layer includes a curable resin of a multifunctional acrylate-based monomer and an acrylate-based oligomer or a curable resin of a multifunctional acrylate-based monomer and an acryl-based elastic polymer, a photopolymerization initiator, and an antistatic agent;
wherein the acrylate-based oligomer and the acryl-based elastic polymer have an elongation of 5% to 200%; and
wherein, the protective film is provided with an antistatic surface on the other surface opposite to the surface facing the photocurable resin layer.

2. The polarizing plate of claim 1, wherein the protective film is further provided with a release surface on the surface facing the photocurable resin layer.

3. The polarizing plate of claim 2 wherein the release surface includes any one selected from the group consisting of a silicone-based and a melamine-based.

4. The polarizing plate of claim 1, wherein, in the curable resin, the multifunctional acrylate-based monomer, and the acrylate-based oligomer or the acryl-based elastic polymer are cured in a weight ratio of 2:8 to 8:2.

5. The polarizing plate of claim 1, wherein the multifunctional acrylate-based monomer includes one or more monomers selected from the group consisting of hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tetraacrylate (PETA) and dipentaerythritol hexaacrylate (DPHA).

6. The polarizing plate of claim 1, wherein the acrylate-based oligomer has two or more acrylate functional groups, and is modified with one or more types selected from the group consisting of urethane, ethylene oxide, propylene oxide and caprolactone.

7. The polarizing plate of claim 1 further comprising inorganic fine particles dispersed into the photocurable resin layer.

8. The polarizing plate of claim 7, wherein the photocurable resin layer includes the inorganic fine particles in 1 part by weight to 100 parts by weight based on 100 parts by weight of the curable resin.

9. The polarizing plate of claim 7, wherein the inorganic fine particles includes one or more types selected from the group consisting of silica nanoparticles, aluminum oxide fine particles, titanium oxide fine particles and zinc oxide fine particles.

10. The polarizing plate of claim 1, wherein the antistatic agent is selected from the group consisting of ionic compounds, conductive fine particles and conductive polymers.

11. The polarizing plate of claim 1, wherein the photocurable resin layer includes the photopolymerization initiator in 0.1 parts by weight to 2 parts by weight and the antistatic agent in 1 part by weight to 10 parts by weight based on 100 parts by weight of the curable resin.

12. The polarizing plate of claim 1, wherein the antistatic surface includes the antistatic agent.

13. The polarizing plate of claim 1, wherein the photocurable resin layer has sheet resistance of $1 \times 10^8$ Q/□ to $1 \times 10^{12}$ Q/□.

14. The polarizing plate of claim 1, wherein the photocurable resin layer has a peeling static voltage of 0.1 kV to 2 kV.

15. The polarizing plate of claim 1, wherein peel strength between the photocurable resin layer and the protective film is from 5 gf/12.5 cm to 30 gf/12.5 cm.

16. The polarizing plate of claim 1, wherein the photocurable resin layer has a thickness of 3 μm to 50 μm.

17. The polarizing plate of claim 1, wherein the maintenance layer has a thickness of 1 μm to 50 μm.

18. A liquid crystal display device comprising:
a backlight unit;
a liquid crystal panel provided on one surface of the backlight unit; and
the polarizing plate of claim 1 provided between the backlight unit and the liquid crystal panel.

* * * * *